United States Patent [19]
Stinson

[11] 4,069,745
[45] Jan. 24, 1978

[54] MOISTURE EJECTOR

[75] Inventor: Robert A. Stinson, Aurora, Ill.

[73] Assignee: Caterpillar Tractor Co., Peoria, Ill.

[21] Appl. No.: 737,643

[22] Filed: Nov. 2, 1976

[51] Int. Cl.² .................... F15B 11/08; F15B 13/042
[52] U.S. Cl. ........................................ 91/442; 137/204
[58] Field of Search ............... 92/82, 142, 79; 91/442, 91/268; 137/204

[56] References Cited

U.S. PATENT DOCUMENTS

| 265,879 | 10/1882 | Shellhorn | 137/204 X |
| 318,022 | 5/1885 | Poor | 91/442 |
| 650,263 | 5/1900 | Morrow | 91/442 X |
| 1,394,337 | 10/1921 | Nordberg et al. | 91/442 X |
| 2,939,477 | 6/1960 | Kaldobsky | 137/204 |

Primary Examiner—Irwin C. Cohen
Attorney, Agent, or Firm—John W. Grant; James R. Bell

[57] ABSTRACT

A moisture collecting pocket is provided in cummunication with the lowest portion of an actuating chamber of an air actuated system wherein compressed air is alternately introduced into and exhausted from the actuating chamber. A valve device is disposed within the pocket and has a restricted flow path formed therein from the pocket through the valve device when it is in an opened position with the valve device being movable to a closed position blocking the flow path each time compressed air is introduced into the actuating chamber.

6 Claims, 1 Drawing Figure

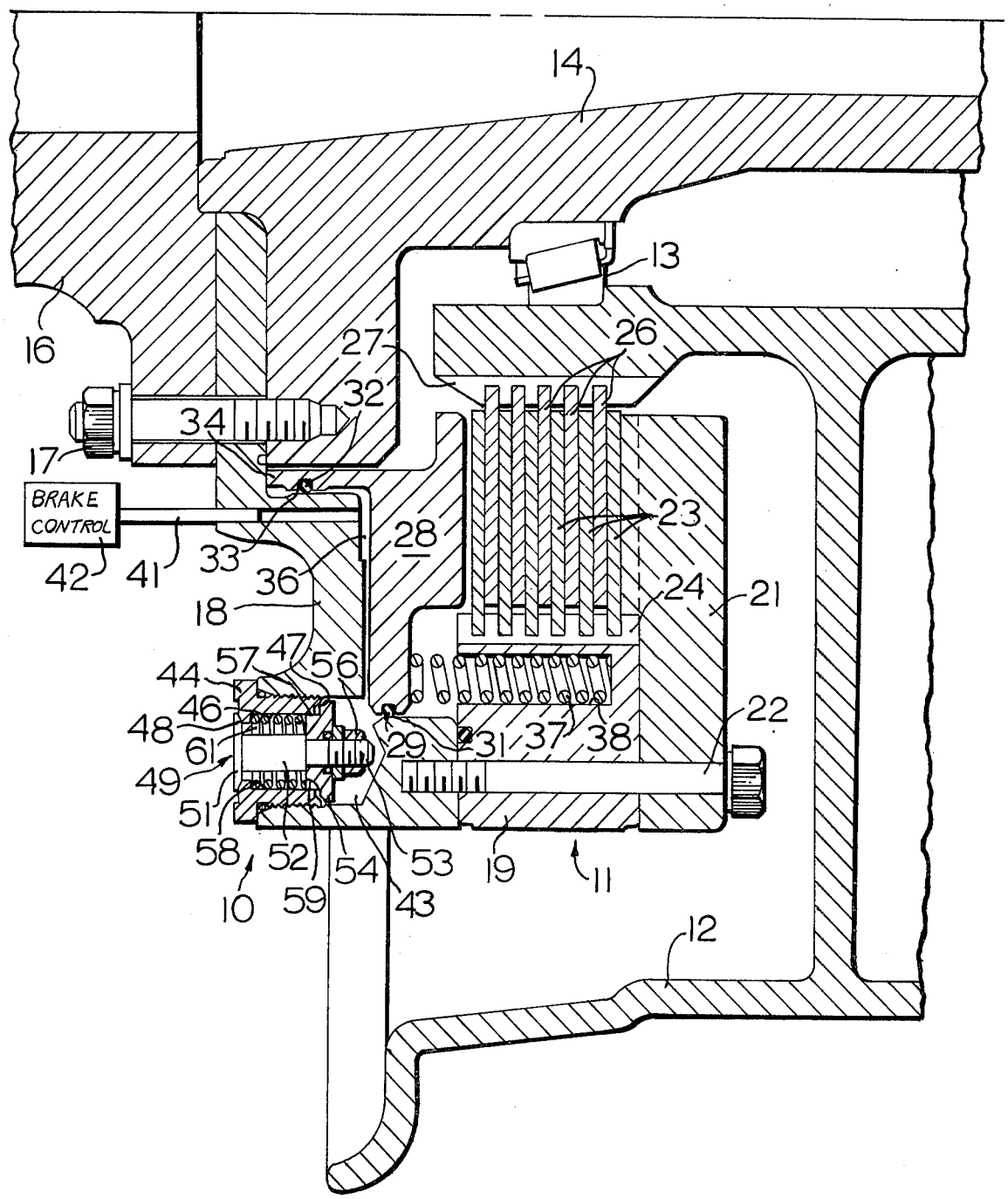

MOISTURE EJECTOR

BACKGROUND OF THE INVENTION

This invention relates to an air actuated brake system and more particularly to a moisture ejector for exhausting accumulated moisture from the system to the ambient.

The brake system of many trucks, earthmoving and industrial vehicles and the like are actuated by compressed air being selectively introduced into an actuating chamber. One of the difficulties associated with any air actuated system is that moisture commonly contained within the air usually condenses in the system and must be drained therefrom periodically for proper operation of the system. Heretofore, the devices for draining the accumulated moisture have normally been connected to one of the storage tanks in the air system. Locating such drain devices at those locations have not been entirely satisfactory since some moisture may still accumulate in the system downstream of the tank and cannot be drained. Also, when the ambient temperature is below freezing, any moisture accumulated in the tank freezes and both the tank and drain device must be heated before the moisture can be drained.

Objects of the Invention

Accordingly, an object of this invention is to provide an improved moisture ejector for automatically exhausting any accumulated moisture from an air actuated system.

Another object of this invention is to provide such an improved moisture ejector which is disposed in the lowest portion of the actuating chamber and operates automatically each time compressed air is introduced into the actuating chamber with a minimum loss of compressed air.

Another object of this invention is to provide an improved moisture ejector of the character described which is positioned in the air actuated system at a location where it is heated by normal operation so that it remains operative in freezing temperatures.

Other objects and advantages of the present invention will become more readily apparent upon reference to the accompanying drawing and following description.

BRIEF DESCRIPTION OF THE DRAWING

The sole FIGURE is a sectional view through a moisture ejector embodying the principles of the present invention incorporated within a disc brake.

DESCRIPTION OF THE PREFERRED EMBODIMENT

Referring now to the drawing, a moisture ejector embodying the principles of the present invention is generally indicated by the reference numeral 10 in association with an air actuated device such as a disc brake partially shown at 11. The disc brake is operative to stop rotation of a rim member 12 which is rotatably supported by a pair of bearings, one of which is shown at 13, on a nonrotatable spindle 14 of a vehicle, not shown. The spindle is fixedly secured to an axle housing 16 by a plurality of threaded fasteners 17 with a radially extending portion of an annular anchor member 18 nonrotatably secured between the spindle and the axle housing. A hub 19 and a reaction cover member 21 are rigidly connected together and to the end of the anchor member 18 by a plurality of circumferentially spaced bolts, one shown at 22. A plurality of stationary friction discs 23 are axially slidably disposed on internal splines 24 formed on the inner surface of the hub and are alternately interleaved between a plurality of rotatable friction discs 26 supported for axial movement on external splines 27 formed on the rim member. The friction discs are positioned axially between the inwardly extending reaction member and an annular actuating piston 28. A seal 29 is disposed in an annular groove 31 formed in the periphery of the piston for sliding sealing engagement with an inner cylindrical surface of the anchor member. Another annular seal 32 is disposed within an annular groove 33 formed in an axially extending projection 34 formed on the piston and sealingly engages another cylindrical surface of the anchor member. The anchor member, piston, and seals cooperate to form a variable volume actuating chamber 36. Each of a plurality of circumferentially spaced compression springs, one shown at 37, are disposed in a separate bore 38 formed in the hub for resiliently urging the piston to the left as viewed in the drawing.

A supply conduit 41 connects the actuating chamber 36 to a brake control 42 which may be selectively operated to introduce compressed air into and exhaust compressed air from the actuating chamber. The introduction of compressed air into the actuating chamber forces the piston 28 to the right as viewed in the drawing, clamping the friction disc 23 and 26 between the piston and the reaction member 21, thereby forcing the friction disc into frictional engagement with each other to stop rotation of the rim member 12. Exhausting the compressed air from the actuating chamber permits the springs 37 to urge the piston to the left to release the clamping force on the friction disc thereby releasing the brake.

A moisture collecting pocket 43 is formed in the anchor member 18 in communication with the lowest portion of the actuating chamber 36. The moisture ejector 10 includes a valve device encapsulated within a threaded body 44 as a unit assembly, the body being threadably sealingly inserted into the pocket 43. The body is provided with a stepped bore 46 extending therethrough, an internal conical valve seat 47 and an external conical valve seat 48 formed on its inner and outer ends, respectively. A movable valve assembly 49 extends through the stepped bore and includes an external valve 51 adapted for seating engagement with the external valve seat when the valve assembly is moved to the right. A stem 52 extends inwardly from the external valve through the stepped bore and has a reduced diameter threaded portion 53 formed on its inner end. An internal valve 54 is sealingly fixed to the reduced diameter threaded portion by a nut 56 and is adapted for sealing engagement with the internal valve seat 47 when the valve assembly is moved to the left. An annular guide surface 57 is formed on the internal valve and slidably extends into the end of the stepped bore adjacent the internal valve seat thereby forming a cavity 58 between the internal and external valves. A plurality of circumferentially spaced metering slots, one shown at 59, are formed in the annular guide surface and provide a restricted flow path from the moisture collecting pocket 43 to the cavity when the internal valve is in the open position shown. A compression spring 61 is disposed within the cavity and resiliently urges the valve assembly to the right so that the external valve normally blocks communication from ambient to the cavity and the pocket is in communication with the cavity through the metering slots.

OPERATION

While the operation of the present invention is believed clearly apparent from the foregoing description, further amplification will subsequently be made in the following brief summary of such operation. During normal operation of the brake, any moisture which condenses in the actuating chamber 36 will settle in the moisture collecting pocket 43 since the pocket is the lowest portion of the actuating chamber. With the brake in the released condition shown, the valve assembly 49 will be in the position shown so that the moisture in the pocket passes through the metering slots 59 into the cavity 58. Upon initial introduction of compressed air into the actuating chamber, some of the compressed air will flow through the metering slots and into the cavity where it reacts against the external valve, thereby forcing the valve assembly to the left to an opened position against the resiliency of the spring 61. The initial opening of the external valve communicates the cavity with the ambient atmosphere permitting the moisture collected in the cavity to drain therefrom. However, even though the air pressure in the cavity drops when the external valve opens, the metering slots are sized to restrict the amount of compressed air which can escape therethrough from the actuating chamber so that the greater air pressure in the actuating chamber acting on the larger area of the internal valve causes the valve assembly to continue its leftward movement until the internal valve is seated against the internal valve seat. At this time, the external valve is in its completely opened position permitting any moisture remaining in the cavity to drain therefrom. Also, with the internal valve in its closed position, the pressure of the air in the actuating chamber may be increased under operator control to engage the brakes in the usual manner.

When the brake is disengaged by exhaustion of the compressed air from the actuating chamber 36, the spring 61 will move the valve assembly 49 to the right so that the external valve 51 is in its closed position against the valve seat. This blocks the entrance of any foreign matter into the actuating chamber.

It is well known that when brakes are applied, heat is generated and transmitted to the surrounding elements. Thus, by incorporating the moisture ejector within the supporting structure of the brake it is also subjected to the heat generated when the brakes are applied. Sufficient heat will normally be generated during normal use of the brake to melt any ice which may form in the moisture collecting pocket 43 and cavity 58 and permit the moisture ejector to operate in the usual manner.

In view of the foregoing, it is readily apparent that the structure of the present invention provides an improved moisture ejector which will automatically exhaust any accumulated moisture formed within the air actuated system with which the moisture ejector is associated. The moisture ejector is disposed within the lowest portion of the actuating chamber and operates to drain moisture therefrom each time compressed air is introduced into the actuating chamber. Also, the moisture ejector is incorporated within an integral element of the brake so that it is subjected to the heat generated by the brakes when they are applied such that the temperature of the moistue ejector will be raised above freezing even though the ambient temperature may be below freezing.

While the invention has been described and shown with particular reference to the preferred embodiment, it will be apparent that variations might be possible that would fall within the scope of the present invention, which is not intended to be limited except as defined in the following claims.

What is claimed is:

1. A moisture ejector in combination with the actuating chamber of a pressure fluid actuated device, said moisture ejector comprising:
   an axle housing;
   an anchor member fixedly connected to the housing including a moisture collecting pocket formed therein connected to the lowest portion of said actuating chamber;
   a threaded body portion sealingly mounted in the pocket including a bore formed therethrough;
   a valve stem mounted in the threaded body portion;
   an external valve connected to a first end of the stem;
   an internal valve connected to a second end of the stem; and
   resilient means in the bore of the threaded body between the internal and external valves for normally urging the external valve into seated engagement with the threaded body and for simultaneously normally urging the internal valve out of seated engagement with the threaded body, and said internal valve being movable by pressure fluid introduced into said actuating chamber to a closed position blocking the flow path each time pressure fluid is introduced into said actuating chamber, whereby said external valve is opened.

2. The moisture ejector of claim 1, further including:
   a source of pressurized fluid operably connected to the anchor member.

3. The moisture ejector of claim 2, further including:
   means formed with the anchor member for communicating pressurized fluid from the source to the pocket.

4. The moisture ejector of claim 1, wherein:
   the internal valve has a greater area relative to the external valve.

5. The moisture ejector of claim 1, further including:
   means formed in the internal valve for communicating fluid between the pocket and the bore.

6. The moisture ejector of claim 1, wherein:
   the resilient means is engaged with a portion of the threaded body adjacent the first end of the stem and engaged with the internal valve adjacent the second end of the stem.

* * * * *